United States Patent [19]

Leandris et al.

[11] Patent Number: 4,793,221
[45] Date of Patent: Dec. 27, 1988

[54] WIRE STRIPPER

[75] Inventors: Sergio Leandris, Fenouillet; Jose Moly, Gratentour, both of France

[73] Assignee: Precision Mecanique Labinal, Bois D'Arcy, France

[21] Appl. No.: 31,840

[22] Filed: Mar. 30, 1987

[51] Int. Cl.$^4$ .............................................. H02G 1/12
[52] U.S. Cl. ..................................................... 81/9.51
[58] Field of Search ........................... 81/9.51; 83/924

[56] References Cited

U.S. PATENT DOCUMENTS 1,618,734 2/1927 Smitak .
4,084,310 4/1978 Dragisic .

FOREIGN PATENT DOCUMENTS 2491690 4/1982 France .

Primary Examiner—Roscoe V. Parker
Attorney, Agent, or Firm—Sandler & Greenblum

[57] ABSTRACT

An apparatus for stripping wire conductors formed by a central conducting core housed in an insulating sleeve includes a main frame supporting a clamping device composed of clamping jaws for holding the wire to be stripped, actuators for closing the jaws of the clamping device, cutting nippers with blades for effecting a cut in the insulating sleeve of the wire without cutting into the core of the wire, actuators for closing the blades of the cutting nippers when the jaws of the clamping device are closed against the wire, and actuators for displacing either the clamping device or the cutting device in the direction of the longitudinal axis of the conductor. The elements of the clamping device are arranged in such a way as to permit the clamping jaws to hold the conducting wire tightly under a constant pressure regardless of the cross-cross section of the wire, and wherein the blades of the cutting nippers are directly coupled to the clamping device in such a way that the blades approach one another to a distance corresponding to the distance between the clamping jaws of the clamping device.

20 Claims, 6 Drawing Sheets

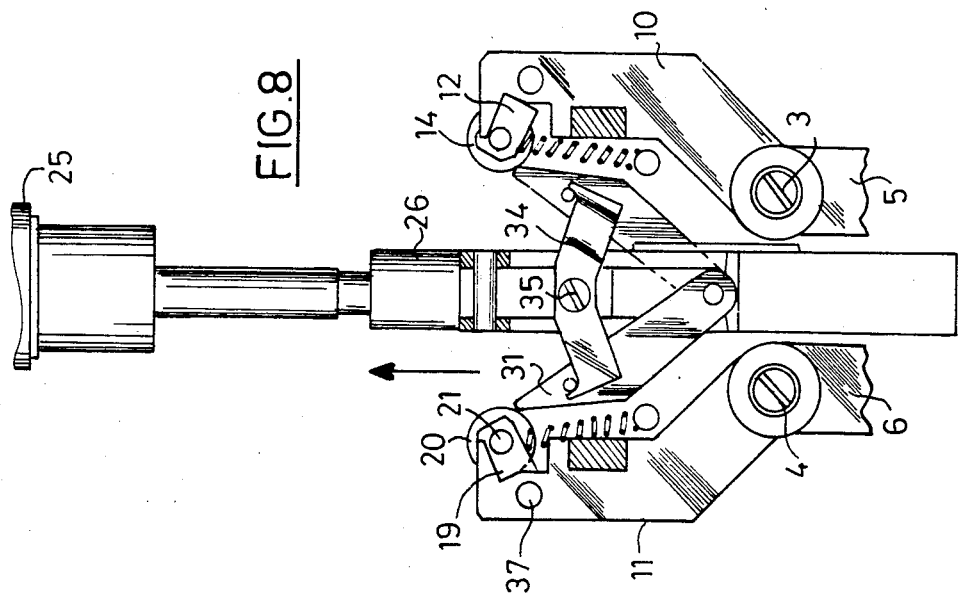
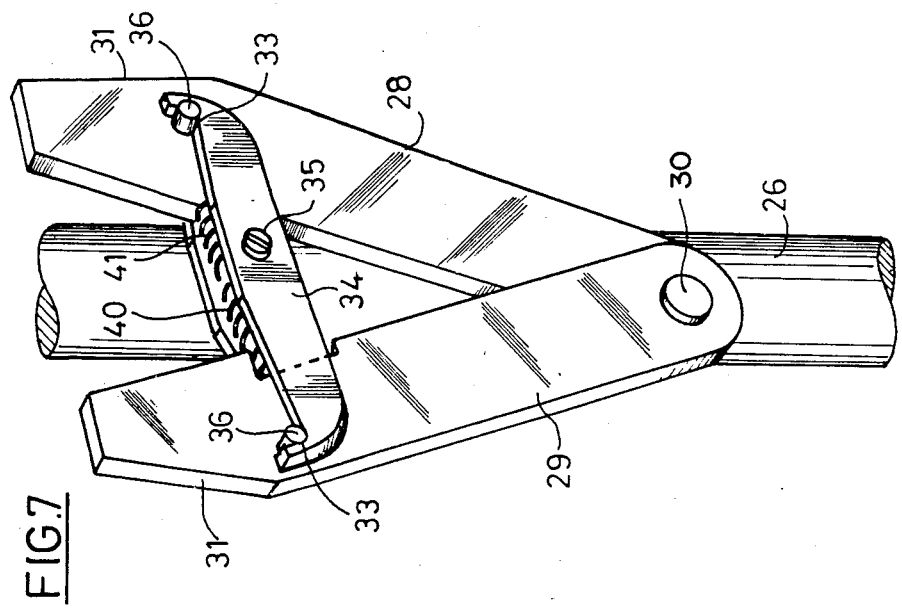

WIRE STRIPPER

BACKGROUND OF THE INVENTION

1. Field of the Invention

The present invention relates to a machine intended to be used for stripping sections of insulation from conducting wire. In particular, the present invention is directed to an apparatus for cutting away the insulating envelope, sleeve or covering in which the wire conductor is embedded, without severing or otherwise damaging the conductor, and also disengaging a section of the conductor corresponding to that part of the insulating sleeve cut away.

2. Discussion of Background and Material Information

Conventionally, conducting wires are composed of a core made of electrically conducting material, which is preferably copper, and a sleeve or cover of insulation material, preferably made of a polymer material, such as plastic or rubber, which exhibits certain flexibility and elasticity.

In order to strip a section of insulation from the wire, the sleeve of insulation material is normally severed, and then the sectioned part of the sleeve is pushed to slide the portion of the cover or sleeve along the core to expose the conducting material. If a section of insulation is to be stripped from an end or extremity of a conducting wire, the end portion of the sleeve which is cut is slid towards the free end of the wire. On the other hand, if an intermediate portion of the cover of the wire is to be stripped, the elasticity and flexibility of the sleeve comes into play because portions of the sleeve on either side of the incision are slid away from each other towards the respective ends of the wire.

Machines for accomplishing such cuts are well known and are used extensively in the production of electrical wiring systems for automobiles, aircraft and the like. In the manufacture of such wiring systems, conducting wires of differing sizes, particularly in cross section, must necessarily be used, particularly in the manufacture of the wiring harness. Consequently, the machine tool used to strip and cut wiring normally has to be changed for each change in the thickness or profile of the conductor, a process that is both complicated, time consuming and inefficient.

SUMMARY OF THE INVENTION

An object of the present invention is to provide an apparatus for stripping wire conductors formed by a central conducting core housed in an insulating sleeve or cover. The apparatus includes a main frame supporting a clamping device composed of clamping jaws for holding the wire to be stripped, means for closing the jaws against the conductor, cutting nippers with blades for slitting or cutting the sleeve without cutting into or otherwise damaging the core, means for closing the cutting nippers when the clamping device is closed, and means for displacing either one of the clamping device and/or the cutting nippers in the direction of the longitudinal axis of the conductor so as to displace and/or deform the sleeve starting at the cut thereby stripping away a predetermined section of the sleeve from the conductor.

Another object of the present invention is to provide a wire stripper, as described above, wherein the clamping device is arranged in such a way as to clamp the jaws of the clamping device against the conducting wire under a constant pressure to hold the wire in a tight fashion regardless of the cross section of the wire. In this regard, the cutting nippers are coupled directly to the clamping device in such a way that the blades of the nippers approach one another to a distance corresponding to the distance between the clamping jaws of the clamping device.

A further object of the present invention is to provide a wire stripper, as described above, wherein the cutting nippers are carried by a plate mounted so as to tilt or pivot on a horizontal axis or hinge. Related to this, means are provided for actuating the tilting of the plate after the jaws of the clamping device have been brought towards each other to hold the conducting wire, and after the blades of the nippers have cut the sleeve.

A still further object of the present invention is to provide an apparatus for stripping wire conductors, as described above, which also includes means for opening the clamping jaws after, and preferably substantially immediately after, the nipper blades have moved the sleeve away from the original cutting effected in the sleeve by the blades.

Another further object of the present invention is to provide an apparatus for stripping wire conductors, as described above, wherein the clamping device includes two branches pivotally mounted on parallel axes on a main frame of the apparatus with each of the branches composed of an extension. The branch extension of the clamping device supports a bar and a roller intended to cooperate with a cam provided on a piston rod of an actuator, i.e., an actuator rod, such that the cutting nippers which are located on the two branches of the cutting nippers are pivotally mounted on parallel axes co-axially with the axes of articulation of the clamping device branches against the action of a return spring which tends to separate the branches. Related to this, the branches of the cutting nippers are each provided with an extension having free ends terminating in a fork between the fingers of which are inserted the corresponding bars of the branch extensions of the clamping device.

The cam provided on the piston rod is made up of two levers, each of which is articulated at an extremity about a common axis and against the action of a spring. Preferably, the cam terminates abruptly so that at the end of the course of movement of the actuator rod, the clamps open suddenly, and the rollers adapted to cooperate with the cam provided on the actuator piston rod are retractably mounted so that during the return course of the actuator rod, the rollers are withdrawn.

It is another object of the present invention to provide an apparatus for stripping wire conductors, as previously described, wherein the piston rod of the actuator includes a second cam, while the mechanism plate is provided with a roller intended to cooperate with the cam. The position on the actuator rod of the second cam is such that it controls the tilting of the mechanism plate which takes place after the conductor has been gripped by the clamping device and after the sleeve has been cut by the blades of the cutting nippers, and preferably also includes means for adjusting the position of the cam which controls the tilting of the plate, wherein the cam controlling the tilting of the plate is made up of a tip pivotally mounted at one extremity against the action of a spring applying it against an abutment formed by a hexagonal nut pivotally mounted on the actuator piston rod. Each of the sides of the hexagonal nut are situated at different distances from the pivot axis.

Another further object of the present invention to provide an apparatus for stripping wire conductors, as previously described, which also includes means for adjusting the position of at least one of the clamping jaws on the corresponding branch of the clamping device, preferably wherein one of the branches of the clamping device includes a bent lever articulated about an axis against the action of a spring bearing against one of its two arms, the other arm carrying the clamping jaw on one of its faces, the other face cooperating with an abutment formed by an eccentric hexagonal nut which turns about an axis.

BRIEF DESCRIPTION OF THE DRAWINGS

The invention will now be described in more detail with reference to a particular embodiment given by way of a nonlimiting example only and represented by the annexed drawings:

FIG. 5 is a larger scale cut-away view of a blade;

FIG. 7 is a detailed perspective view of the cams controlling the tightening of the clamping device; and FIG. 8 shows a detail of the working of the machine.

DETAILED DESCRIPTION

Figure 1:
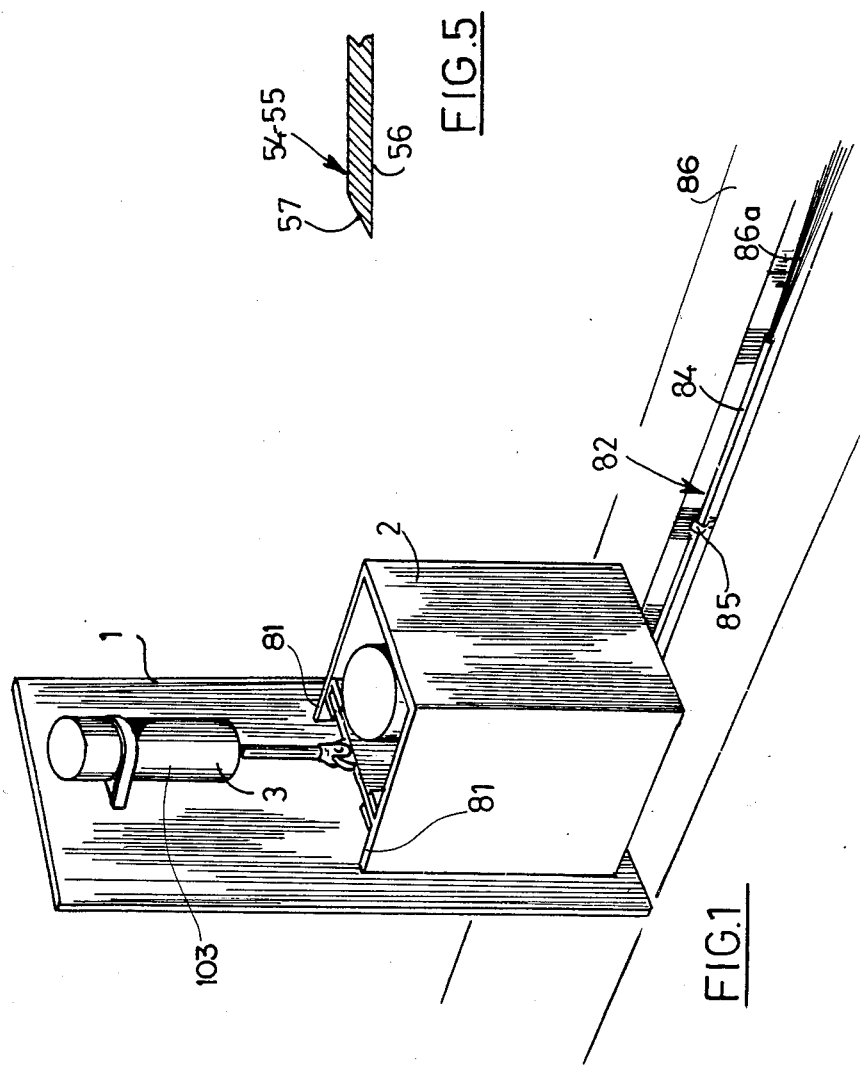
FIG. 1 is a schematic perspective view of the machine.

One of the goals of the present invention is to remedy the previously discussed disadvantages of conventional wire strippers and to provide a machine which permits, without any modification of the machine, the accurate and precise stripping of insulation from wire conductors which may have varying cross sections, without any risk of damage to the conductive core of the wire.

The machine, according to the present invention, is intended to strip conducting wires composed of a central conducting core housed in an isulating sleeve, cover or jacket. The machine is the type which includes a frame supporting a clamping device composed of clamping jaws for holding the wire to be stripped, means for closing the clamping device onto the conductor, cutting nippers with blades for cutting the sleeve of insulation without cutting into the conductive core of the wire, means for closing the blades of the cutting device when the jaws of the clamping device are closed, and means for displacing either the clamping device or the cutting nippers in the direction of the longitudinal axis of the conductor so as to displace and/or deform the sleeve starting at the cut.

The particular arrangement of elements of the wire stripper in accordance with the present invention permits obtaining a stripped part in an efficient manner. To this end, the clamping device may be arranged in such a way so as to hold the conducting wire tightly under a constant pressure regardless of the cross-section of the wire, and the cutting nippers of the cutting device are directly coupled to the clamping device in such a way that the blades of the nippers approach one another to a distance corresponding to the distance between the clamping jaws. The cutting nippers are preferably carried by a plate mounted so as to tilt on a horizontal axis with means being provided for actuating the tilting of the plate after the jaws have been brought nearer to each other in order to hold the conducting wire as well as after the blades have cut the sleeve.

In the previously described arrangement of elements, the cutting nippers are directly linked to the clamping jaws. Inasmuch as the clamping jaws can hold conducting wires of different cross sections under constant pressure, and because the cutting nippers effect cuts corresponding to the different insulating sleeve cross sections without cutting into the core of the conducting wire, the wire stripping is carried out in an efficient and effective manner. The wire stripper of the present invention also includes means for bringing about the opening of the clamps immediately after the blades have moved the sleeve away from the original cutting point.

According to one novel and unique construction feature, the clamping device of the wire stripper is composed of two branches which are pivotally mounted on parallel axes on the main frame of the machine. Each branch of the wire stripper apparatus is composed of an extension supporting a bar and a roller intended to cooperate with a cam provided on the piston rod of an actuator. The cutting nippers are also formed by two branches. Each of the branches of the nippers are pivotally mounted on parallel axes, co-axially with the axes of articulation of the clamping device branches, against the action of a return spring tending to separate them. In addition, each of the branches of the cutting nippers are provided with an extension and have a free end terminating in a fork such that the corresponding bars of the branch the fingers of the fork extensions of the clamping device can be inserted. A relatively simple means for coupling the clamping device and cutting nippers is realized in this way.

Another novel feature of the wire stripper of the present invention is that the cam provided on the piston rod is made up of two levers, each of which is articulated at one extremity about a common axis, and against the action of a spring. In a preferred embodiment, a cam terminates abruptly so that the clamps open suddenly at the end of the course of the actuator rod.

A further feature of the wire stripper of the present invention is that the rollers intended to cooperate with the cam provided on the actuator piston rod are retractably mounted so that they are withdrawn during the return course of the actuator rod.

Another unique feature of the wire stripper of the present invention is that the actuator piston rod may include a second cam. In this instance, the mechanism plate is provided with a roller intended to cooperate with this cam so that the position on the actuator rod of this cam is such that it controls the tilting of the mechanism plate. The tilting of the mechanism plate takes place after the conductor has been gripped by the clamping device and after the sleeve has been cut by the blades of the cutting nippers. Accordingly, the clamping of the conductor and the cutting of the insulation jacket, as well as the stripping operation, may be carried out using only one actuator.

In order to be able to modify the length of the stripped part, the wire stripper of the present invention is also provided with means for adjusting the position of the cam which controls the tilting of the plate. According to another unique feature of the present invention, the cam controlling the tilting of the plate is made up of a tip pivotally mounted at one extremity against the action of a spring applying it against an abutment. The abutment is preferably formed by a hexagonal nut pivotally mounted on the actuator piston rod with each face of the nut being situated at a different distance from the pivot axis.

In order to permit an adjustment of the machine at the start of operation or when the blades are changed, the wire stripper of the present invention is equipped with means for adjusting the position of at least one of the clamping jaws on the corresponding branch of the clamping device.

Also, according to another construction feature of the present invention, one of the branches of the clamping device is composed of a bent lever articulated about an axis against the action of a spring bearing against one of its two arms. The other arm carries the clamping jaw on one of its faces. The other face cooperates with an abutment formed by an eccentric hexagonal nut which turns about an axis.

Reference will now be made to the attached drawings for the details of the wire stripper of the present invention previously discussed above in more general terms.

As shown in FIG. 1, the machine represented in the drawings includes a fixed frame 1, along side of which a vertically mobile frame 2, controlled by an actuator 103, is positioned.

Figure 2:
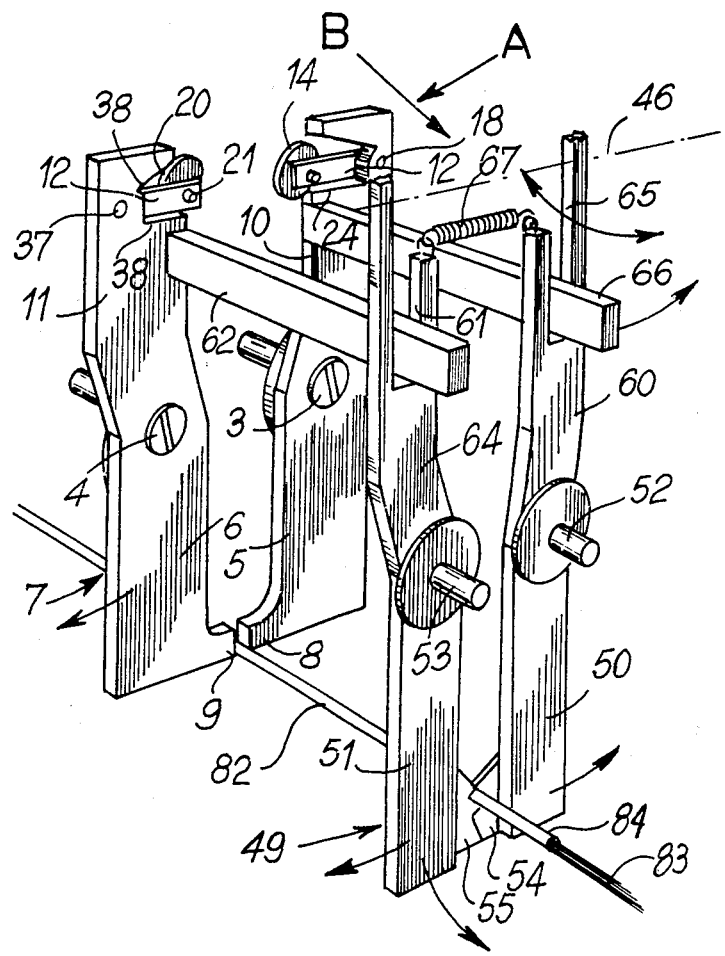
FIG. 2 is a schematic perspective view of the clamping assembly.
Figure 3:
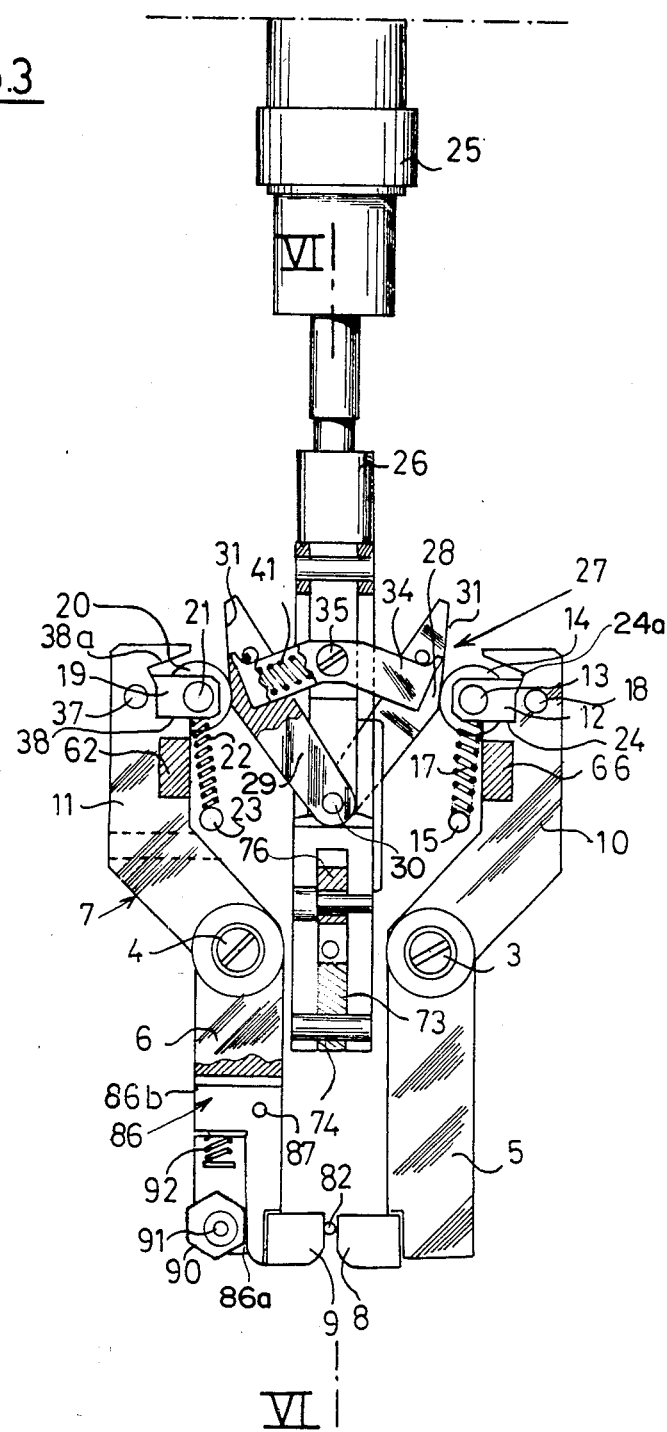
FIG. 3 is a partially cut-away detailed view along the arrow A of FIG. 2.

Turning now to FIGS. 2 and 3, branches 5 and 6 of a clamping device 7 are articulated about journals 3 and 4 for holding the sleeve 84 of a strip of conducting wire tightly between the jaws associated with these branches. As shown, the clamping device 7 is composed of two clamping jaws 8 and 9, and two opposite extensions 10 and 11. The extension 10 is provided with a small bar or clevis 12 articulated between two abutments 24, 24a about an axis 18, and supports a pin 13 about which a roller 14 turns.

One of the extremities of a draw spring 17 is fastened to a stud 15 on the main frame 1 and the other extremity of the spring 17 is fastened to the clevis and acts to keep the branch 5 of the clamp 7 in the open position.

The extension 11 is arranged in the same way as extension 10 with a short bar 19, articulated about an axis 37, a roller 29 mounted on an axis 21, and a draw spring 22 inserted between the short bar or clevis 19 and a stud 23. The small bar 19 can pivot between two abutments 38 and 38a.

Referring now more specifically to FIG. 3, the frame 2 carries an actuator 25 whose piston rod 26 supports a cam assembly 27. The cam assembly 27 is composed of two layers 28 and 29 articulatd about an axis 30 and each presenting a ramp 31. A stop piece 34, which includes hooks 33 cooperating with the studs 36 provided on the levers 28 and 29, respectively, is fitted to rod 26 by screws 35. Compression springs 40 and 41 which tend to maintain the studs 36 against the hooks 33 are inserted between the screw 35 and levers 28 and 29. When the rod 26 is displaced downwardly, the ramps 31 come into contact with the rollers 14 and 20 and in this way the ramps tend to pivot the branches 5 and 6 against the action of the springs 17 and 22 in order to bring the clamping jaws 8 and 9 together. If the jaws 8 and 9 have to clamp against or hold a conducting wire having a large cross-section very tightly, then the levers will cancel each other out under the action of the springs 40 and 41. In accordance with the present invention, therefore, the conductor wires are clamped by the jaw which exert essentially the same pressure regardless of the cross-section of the wire.

Figure 4:
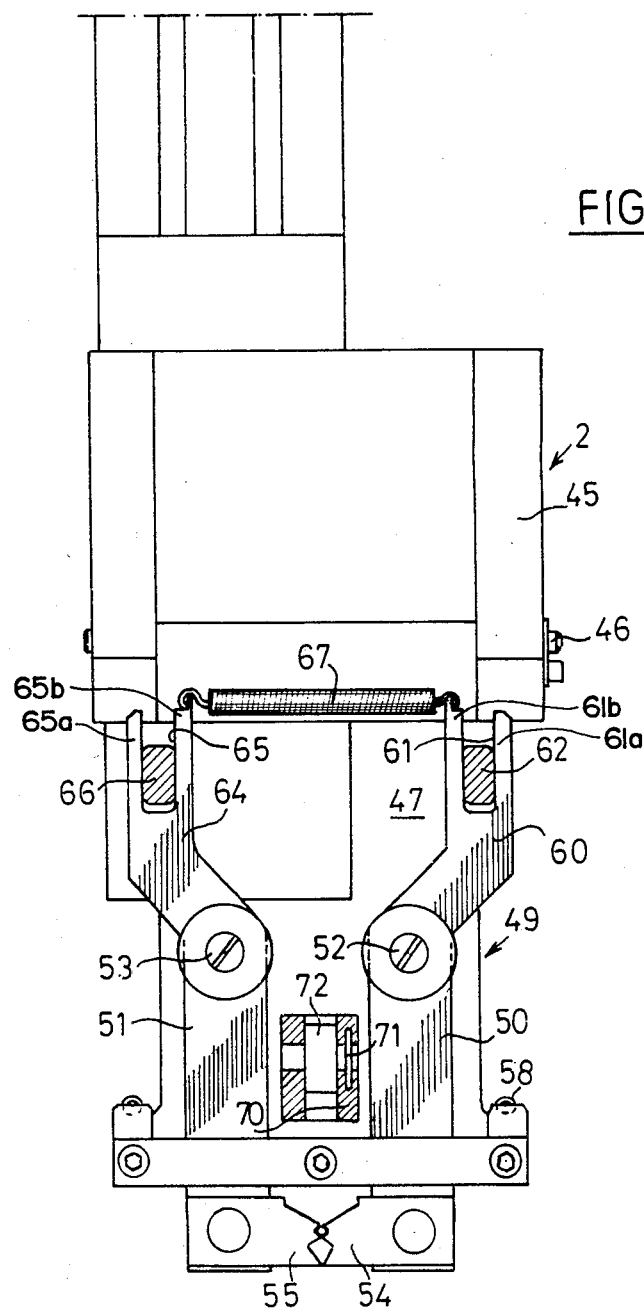
FIG. 4 is a partially cut-away view along the arrow B of FIG. 2.
Figure 6:
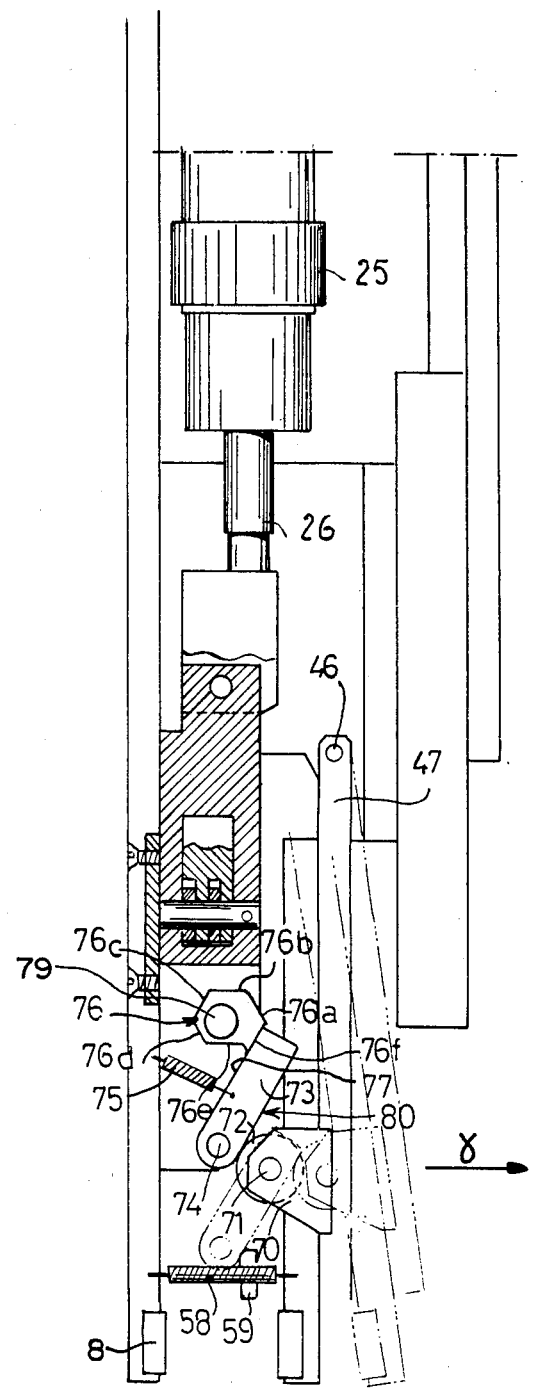
FIG. 6 is a cut-away view along the line VI—VI of FIG. 3.

Turning now to FIGS. 2, 4 and 6, the frame 2 is shown as being composed of two side walls 45 between which a plate 47, which carries the conductor sleeve cutting nippers 49, is articulatd about an axis 46.

As shown in more detail in FIG. 4, the cutting nippers 49 are composed of two branches 50 and 51 which are pivotally mounted about axes 52 and 53, and each carry a blade 54 and 55, respectively. Each blade includes a cutting part having an edge in the form of a V with a rounded apex. Preferably, one of the edges of the blades is bevelled, the other is straight. The plate 47 is forced by a spring 58 against an abutment 59, which corresponds to a reference position starting from which the conductor sleeve must be cut. The branch 50 includes an extension 60 which is terminated by a fork 61 in between the fingers 61a, 61b of which is inserted a bar 62 connected to the extension 11 of the clamping device 7. The branch 51 consists of an extension 64, the extreme free end of which is terminated by a fork 65 having fingers 65a, 65b between which extends a bar 66 connected with the extension 10 of the clamping device 7. The forks 61 and 65 are connected by a draw spring 67 which tends to spread apart the branches 50 and 51, and the branches 5 and 6, at essentially the same time because the movement of the two clamps 11 and 49 are linked one to another. As shown in FIG. 2, the axes 4 and 53 are co-axial, as are the axes 3 and 52. The plate 47 carries a clevis 70, the axis of which supports a roller 72 intended to cooperate with a cam 80 mounted at the free end of the rod 26 of the actuator 25.

Referring more particularly to FIG. 6, the cam is made up of a tip 73 pivotally mounted about an axis 74. One face of the cam is applied by the action of a spring 75 against an abutment 76. The abutment has six sides 76a, 76b, 76c, 76d, 76e and 76f, each of which are at a different distance from an axis 79 about which the abutment can be adjusted such that the plate 47 tilts to a greater or lesser extent during the downward motion of the rod 26 of the actuator 25. In the position represented in FIG. 6, the tilting of the plate will be the greatest in amplitude. In contrast, when the face 77 of the tip 73 of the cam bears against the side 76e, the tilting of the plate 47 will have its smallest angular value. The amplitude of the tilting of the plate 47 governs the length of conductor stripped of its insulating cover.

Turning back to FIG. 1, the movable frame 2 is guided by means of at least one sliding rail 81 on the main frame 1. The conductor 82 is composed of a core 83, as shown in FIG. 2, and an insulating sleeve 84. The conductor is threaded or otherwise fed by an appropriate means under the apparatus, for example by hand, and fixed by the clamps 85 in a groove 86a provided on a table 86.

Referring again to FIG. 3, at least one of the jaws, for example, the jaw 9 may be carried by a bent lever articulated about an axis 87. When this is the case, one of the arms 86a bears against an abutment 90 formed by a hexagonal nut positioned eccentrically about an axis 91. As shown, a compression spring 92 is inserted or otherwise interpositioned between the arm 86b and the branch 6 for the purpose of maintaining the lever against the abutment. Such an arrangement allows the adjustment of the position of the jaw 9. In order to do so, the abutment 90 is turned so as to regulate the initial separation of the jaws 8 and 9 as a function of the separation of the blades 54–55.

The operation of the machine is carried out in the following manner. Initially, the frame 2 is forced downwards by the actuator 103, in such a way that the jaws 8 and 9 of the clamping device 7 and the blades 54 and 55 of the cutting device 49 are positioned on either side of the conductor 82. The rod 26 of the actuator 25 is then pushed downwardly. During the initial course of its downward movement, the ramps 31 come into contact with the rollers 14 and 20, in such a way that the branches 5 and 6 are pivoted about the axes 3 and 4 against the action of the springs 17 and 22 so as to clamp between the clamping jaws 8 and 9 of the clamping device. At the same time, the branches 50 and 51 of the nippers 49 are brought closer together and pivot about axes 52 and 53 in such a way that the sleeve 84 is cut by the blades 54 and 55. The action of cutting the sleeve is initiated by the small bars 62 and 66 which are connected to the extensions 11 and 10, respectively, the first bar 62 cooperating with the fork 61 and the second bar 66 cooperating with the fork 65.

The pivoting of the branches 5 and 6 in clamping against the conductor 82 is limited by the cross-section of the conductor, because the levers 28 and 29 which make up the control cam 27 of the clamp 7 are pivotally mounted against the action of the spring 41 and its counterpart so that after a certain pressure is applied, this being a function of the scaling or loading of the springs, the levers 28 and 29 are withdrawn.

Inasmuch as the closing of the branches 50 and 51 carrying the blades 54 and 55 is directly linked to the clamping of the jaws 8 and 9, the blades 54 and 55 will effect a cut in the sleeve 84 corresponding to the thickness of the sleeve, regardless of the total crosssection of the conductor. Such an arrangement is, therefore, particularly advantageous, because it avoids the need to change tools for each conductor diameter, yet it still assures that the core 83 of the conductor is not cut.

The rod 26 of the actuator 25 continues on its downward course and the cam 80 comes into contact with the roller 72 in such a way that the plate 47 tilts in the direction of the arrow f, as shown in FIG. 6, around the axis 46 and against the action of the spring 75. As illustrated, the ramps 31 are of a length such that during the entire downward course of movement of rod 26, the clamping jaws 8 and 9 are forced towards each other to tightly hold or clamp the conductor 82 between the jaws because the blades are held very closely together. During the tilting or pivoting of the plate 47, the sleeve 84 of the conductor is stripped or forced away from the point where the insulation sleeve or covering is cut by the blades 54, 55, thus stripping a length of the sleeve 84 of conductor 82 corresponding to the distance of the movement of blades 54, 55 as a result of the pivoting of plate 47. The rod 26 continues to descend until the rollers 14 and 20 pass the upper extremities of the ramps 31 which form an abrupt termination such that the branches 5 and 6 of the clamping device 7 and the branches 50 and 51 of the cutting nippers 49 immediately and at the same time are pulled away from each other by the action of the spring 67, which is shown more clearly in FIG. 8. During the return of the rod 26 to its initial position, the small bars 12 and 19 are withdrawn and brought to bear against the abutments 24a and 38a by the action of the springs 17 and 22.

As previously mentioned, the length of the stripped portion of the insulation sleeve or covering of the conductor core of the wire can be modified according to the angular position of the abutment 76. Also, the cam 90 enables the position of the clamping jaw 9 to be adjusted such that the pressure of the clamping device 7 corresponds exactly to the cutting of the sleeve 84 without risk of the conductor core 86 being cut. This adjustment is made at the start of operation of the machine or after the replacement of the blades 54 and 55.

The invention is not, of course, limited to the embodiment described above and represented in the drawings. Many modifications to the details can be made still keeping within the scope of the present invention.

Accordingly, from the foregoing description one skilled in the art can easily ascertain the essential characteristics of this invention and, without departing from the spirit and scope thereof, make various changes and modifications of the invention to adapt it to various usages and conditions.

What is claimed:

1. An apparatus for stripping a wire conductor formed by a central conducting core housed in an insulating sleeve comprising:
    (a) a clamping device including clamping jaws for holding the wire conductor to be stripped under a constant pressure regardless of the cross-section of the wire conductor;
    (b) means for actuating the closure of said clamping jaws to hold said conductor operably connected to said clamping device;
    (c) cutting nippers mounted on a plate adapted to tilt about an axis substantially perpendicular to a longitudinal axis of said wire conductor to be stripped, said cutting nippers being also directly coupled to the clamping device in such a way that said blades approach one another to a distance corresponding to the distance betwen said clamping jaws of said clamping device for effecting a cut in said sleeve without cutting into said core of said wire conductor spaced a predetermined distance from and operably coupled to said clamping device;
    (d) means for closing said blades when the clamping jaws are closed operably connected to the cutting nipper; and
    (e) means for displacing said clamping device and said cutting nippers with respect to each other in the direction of the longitudinal axis of said conductor so as to displace said sleeve starting at the cut so as to obtain a stripped part operably connected to said clamping device and said cutting nippers.

2. The apparatus for stripping wire conductors in accordance with claim 1, further comprising means for tilting said plate operably associated with said plate and adapted to tilt said plate after said jaws have been brought nearer to each other to hold said conductor after said blades have cut said sleeve.

3. The apparatus for stripping wire conductors in accordance with claim 2, further comprising means for opening said jaws operably associated with said jaws and adapted to open said jaws after said blades have moved said sleeve away from the original cutting point effected in said sleeve by said blades.

4. The apparatus for stripping wire conductors in accordance with claim 3, wherein said means for actuating includes a piston rod and said clamping device further comprises two clamping device branches pivotally mounted on parallel axes of articulation on a main machine frame, each of said cutting device branches including an extension supporting a bar, and a roller adapted to cooperate with a cam provided on said piston rod.

5. The apparatus for stripping wire conductors in accordance with claim 4, wherein said cutting nippers include two cutting nipper branches pivotally mounted on parallel axes co-axially with the axes of articulation of said clamping device branches against the action of a return spring adapted to separate said cutting nipper branches.

6. The apparatus for stripping wire conductors in accordance with claim 5, wherein the cutting nipper branches are each provided with an extension having a free end terminating in a fork with fingers adapted to receive said bar.

7. The apparatus for stripping wire conductors in accordance with claim 6, wherein said cam provided on the piston rod includes two levers which are articulated at an end about a common axis and against the action of a spring.

8. The apparatus for stripping wire conductors in accordance with claim 7, wherein said cam terminates abruptly so that the clamping jaws open at the end of the course of the piston rod.

9. The apparatus for stripping wire conductors in accordance with claim 8, wherein said rollers are retractably mounted so that said rollers are withdrawn during the return course of the piston rod.

10. The apparatus for stripping wire conductors in accordance with claim 9, wherein said piston rod includes another cam and said plate is provided with a roller adapted to cooperate with said another cam.

11. The apparatus for stripping wire conductors in accordance with claim 10, wherein the position of said another cam on the piston rod is such that said another cam controls the tilting of said plate to take place after said conductor has been gripped by the jaws of the clamping device and after the sleeve has been cut by the blades of the cutting nippers.

12. The apparatus for stripping wire conductors in accordance with claim 11, further comprising means for adjusting the position of said cam which controls the tilting of the plate operably associated with said cam.

13. The apparatus for stripping wire conductors in accordance with claim 12, wherein said cam which controls the tilting of the plate includes a tip pivotally mounted at one extremity against the action of a spring.

14. The apparatus for stripping wire conductors in accordance with claim 13, further comprising an abutment including a hexagonal nut pivotally mounted on said piston rod.

15. The apparatus for stripping wire conductors in accordance with claim 14, wherein each of the sides of the hexagonal nut are situated at different distances from the pivot axis.

16. The apparatus for stripping wire conductors in accordance with claim 15, wherein said spring is adapted to bias the tip of said plate against said abutment.

17. The apparatus for stripping wire conductors in accordance with claim 16, further comprising means for adjusting the position of at least one of the clamping jaws on a corresponding branch of the clamping device.

18. The apparatus for stripping wire conductors in accordance with claim 17, wherein at least one of the branches of the clamping device includes a bent lever articulated about an axis against the action of a spring.

19. The apparatus for stripping wire conductors in accordance with claim 18, wherein said at least one of the branches has two arms and said spring biases against one of the two arms.

20. The apparatus for stripping wire conductors in accordance with claim 19, wherein another of the two arms has at least two faces and carries a clamping jaw on one of the two faces, another of the two faces cooperating with an abutment formed by an eccentric hexagonal nut which turns about an axis.

* * * * *